US006528622B1

(12) United States Patent
Ayers et al.

(10) Patent No.: US 6,528,622 B1
(45) Date of Patent: Mar. 4, 2003

(54) METHOD OF SEPARATING AND RECOVERING PROTEINS FROM A PROTEIN SOLUTION

(75) Inventors: John Stephen Ayers, Palmerston North (NZ); David Francis Elgar, Palmerston North (NZ); Mark Pritchard, Palmerston North (NZ)

(73) Assignees: Massey University (NZ); New Zealand Dairy Board (NZ)

( * ) Notice: Subject to any disclaimer, the term of this patent is extended or adjusted under 35 U.S.C. 154(b) by 0 days.

(21) Appl. No.: 09/117,401

(22) PCT Filed: Jan. 27, 1997

(86) PCT No.: PCT/NZ97/00005
§ 371 (c)(1),
(2), (4) Date: Apr. 30, 1999

(87) PCT Pub. No.: WO97/26797
PCT Pub. Date: Jul. 31, 1997

(30) Foreign Application Priority Data

Jan. 26, 1996 (NZ) ................................................ 280892

(51) Int. Cl.[7] .......................... C07K 1/18; C07K 1/34; C07K 14/26; C07K 16/04
(52) U.S. Cl. ...................... 530/364; 210/669; 210/691; 426/271; 530/366; 530/387.1; 530/395; 530/414; 530/416; 530/833
(58) Field of Search ................................ 530/366, 414, 530/364, 416, 387.1, 395, 833; 210/669, 691; 426/271

(56) References Cited

U.S. PATENT DOCUMENTS

| | | | |
|---|---|---|---|
| 4,218,490 A | 8/1980 | Phillips et al. | 426/549 |
| 4,582,580 A | 4/1986 | Goudal et al. | 210/669 |
| 4,834,994 A | 5/1989 | Kuwata et al. | 426/271 |
| 5,077,067 A | 12/1991 | Thibault | 426/271 |
| 5,179,197 A * | 1/1993 | Uchida et al. | 530/366 |
| 6,096,870 A | 8/2000 | Mozaffar et al. | 530/366 |

FOREIGN PATENT DOCUMENTS

| | | |
|---|---|---|
| EP | 0282200 | 2/1988 |
| EP | 0320152 | 11/1988 |
| EP | 0393850 | 3/1990 |
| EP | 488589 A1 | 11/1991 |
| FR | 2452881 | 10/1980 |
| GB | 1563990 | 5/1978 |
| GB | 2188526 | 2/1986 |
| GB | 2179947 | 7/1986 |
| GB | 2251858 | 1/1992 |
| JP | 90-042943 | 2/1990 |
| JP | 2104533 | 4/1990 |
| JP | 94-062756 | 3/1994 |
| JP | 95-203863 | 8/1995 |
| JP | 96-515016 | 10/1996 |
| NL | A 7411960 | 3/1976 |
| NZ | 237452 | 3/1991 |
| NZ | 240473 | 11/1991 |
| NZ | 241328 | 11/1993 |
| WO | WO89/10064 | 4/1988 |
| WO | WO97/26797 | 1/1997 |

OTHER PUBLICATIONS

Fox, P.F., Ed. "Developments in Dairy Chemistry—1" Chapter 11, pp. 339–343, Applied Science Publishers, London/NY (1982).
"*Separation by Adsorption. II. Specific Adsorbents*", Chapter 5, Ion Exchanges—Principles, Properties, and Uses, pp. 101–119, RKS Scopes In Protein Purifications, Principles and Practices, 2d Ed., Springer–Verlag, New York 1987.
D.E. Palmer, "*High Purity Protein Recovery*", Process Biochemistry, Jun. 1977, pp 21–26.
Paul J. Skudder, "*Evaluation of a porous silica–based ion-exchange medium for the production of protein fractions from rennet– and acid–whey*", Journal of Dairy Research (1985), pp 167–181.
John Howell, Rod Dove, Tamotsu Kuwata, "*Manufacture and Use of High Protein Whey Products*", ADPI/CDR Dairy Products Technical Conference, pp 43–59.
Kanekania, Lewis, "*Extraction of whey protein by cellulosic ion–exchange resins*", Process of foood engineering, 1986, pp 389–391.
JS Ayers, MJ Petersen, "*Whey Protein Recovery Using a Range of Novel Ion–exchangers*", New Zealand Journal of Dairy Science and Technology, 1985, 20, pp 129–142.
JS Ayers, DF Elgar, MJ Petersen, "*Whey Protein Recovery UsingIndion® S, An Industrial Ion Exchanger for Protein*", New Zealand Journal of Dairy Science and Technology, 1986, 21, pp 21–35.

* cited by examiner

*Primary Examiner*—David Saunders
(74) *Attorney, Agent, or Firm*—Knobbe, Martens, Olson & Bear LLP

(57) ABSTRACT

A preparative method of isolating a preselected whey protein or group of whey proteins from a solution is provided. The method comprises the following steps: (a) contacting a whey protein solution with the preselected ion exchanger for a time and at a temperature sufficient to enable the preselected whey protein to be adsorbed; wherein the whey protein solution has (1) a protein content in the range of about 5% to about 20% by weight, (2) a pH of a preselected level, which is the level at which the preselected whey protein or group of whey proteins selectively binds to the preselected ion exchanger, and (3) a reduced ionic strength; and (b) recovering either or both of the following: (1) the whey protein component adsorbed in step (a), and (2) the breakthrough whey protein component not adsorbed in step (a). It is preferred that the whey protein solution is a retentate obtained via ultrafiltration of whey, having reduced ionic strength, or a whey protein concentrate powder which has been reconstituted with water.

20 Claims, 2 Drawing Sheets

METHOD OF SEPARATING AND RECOVERING PROTEINS FROM A PROTEIN SOLUTION

FIELD OF THE INVENTION

This invention relates to a preparative method for separating and recovering whey proteins from a protein solution. More particularly, it relates to a process for separating and recovering proteins from a whey protein solution using ion exchange.

BACKGROUND OF THE INVENTION

It is known in the art that proteins can be fractionated and recovered from whey protein solutions using ion exchange. It is also known that there are a large number of parameters which determine the protein capacity of the ion exchanger, the yield of protein and which particular proteins are adsorbed by which type of ion exchangers under what conditions. For example, the pH of the protein solution and the isoelectric point (IEP) of the protein largely determine whether the protein will bind to a cation or anion exchanger. In addition, the protein is in competition for binding sites with other ionic species in solution, such as salts, and this competition can reduce or even prevent the adsorption of the protein. There are also behavioural differences between the many ion exchangers available for use. The information published over the last twenty years concerning the separation of whey proteins has largely been determined empirically.

It is also known, and the applicants have confirmed, that preconcentration of whey protein solution above a concentration of about 2% protein prior to ion exchange results in a loss of protein capacity in the ion exchanger. This is true for proteins in general. R K S Scopes (in Protein Purification, Principles and Practices, 2nd Edition, pages 101 and 118, Springer-Verlag, N.Y., 1987) advocates the use of protein concentrations of 0.5% and states that 3% is too high especially if a substantial proportion of the protein is going to be adsorbed.

The prior art therefore generally teaches the application of dilute whey protein solutions to ion exchangers. See for example, Palmer (*Process Biochemistry*, 1977, 12, 24–28), Phillips, Jones and Palmer (U.S Pat. No. 4,218,490), Bottomley (EP 0,320,152), Mirabel (GB 1,563,990), Skudder (*J. Daily Research*, 1985, 52, 167–181), Kawasaki and Dosako (EP 0,488,589), Burton and Shudder (GB 2,188,52) and Kawasaki, Dosako, Shimatani and Idota (GB 2,251, 858). These references teach the use of whey with a protein concentration of 0.5–0.7% as starting material for contacting with the ion exchanger.

The use of low protein concentrations to separate and recover whey proteins has disadvantages arising from the necessity to use large volumes of solution. These disadvantages include the need to use larger vessels, and long transfer times in and out of the vessel (either a batch reactor or a column) for the protein solution. Such processes may therefore be uneconomic, particularly when used to prepare whey protein components on an industrial scale.

Some references mention that an ultrafiltration retentate of whey or whey protein concentrate powder (WPC) can be used as a starting source of whey proteins, but give no examples (see eg EP 0,488,589 and GB 2,251,858). Others give examples, but either limit the concentration factor to 2.5 fold (Palmer, 1977, above) or 5-fold (GB 2,179,947) or alternatively concentrate much further but then dilute with water back to a protein concentration of 0.6% (Morinaga, JP 2,104,533) or 1% (EP 0,320,152). Thus, these references avoid high protein concentrations in the starting materials. For example, in US. Pat. No. 4,218,490 it is stated that "If desired, step (a) (the ion exchange step) can be preceded by an initial concentration step effected, for instance, by ultrafiltration". However, the same author limits the utility of this pre-concentration to a level of 1.5% protein, that is, a 2.5 fold concentration (see Palmer, 1977, referred to above).

As noted above, the prior art generally teaches avoiding using high protein. concentrations in the raw materials. EP 0,320,152 does give an example (Example 2) where a WPC 60 (600% protein on total solids, which is probably a 10–15% protein solution) is passed through a column of anion exchanger. However, the utility of this is not mentioned or apparent and it is believed that, although the method worked in that the column bound whey proteins other than Ig, the protein capacity of the ion exchanger was low.

U.S Pat. No. 4,834,994, which is directed to the selective adsorption of β-lactoglobulin by a cation exchanger, refers in claim 3 to WPC as a possible starting material. It is clear however that this patent only contemplates the use of dilute whey protein solutions, with protein concentrations in the range of 0.5 to 1.5%. Example 4 in the patent uses only a 2-fold concentration of the whey and in a further option dilutes this with an equal volume of water. A very large quantity of water is required to do this, which is not practical, particularly on an industrial scale.

U.S Pat. No. 5,077,067 (Thibault) also relates to the selective adsorption of β-lactoglobulin but by an anion exchanger. Example 4 of Thibault takes a WPC-powder and reconstitutes it at 10% solids (8% protein). When this is mixed with ion exchanger (as in Example 4), there will be considerable amount of further dilution by water in the bed of the ion exchanger, which means that the actual protein concentration of the solution contacting the ion exchanger is only about 4%.

The applicants believe it would be desirable for reasons stated below to be able to use more concentrated whey protein solutions in methods of isolating whey proteins using ion exchange. They have also surprisingly found that this can be achieved, while maintaining efficient use of the ion exchanger, by contacting a concentrated whey protein solution having reduced ionic strength with the ion exchanger.

It is therefore an object of the present invention to provide a method of separating whey proteins which goes some way towards achieving the above desideratum, or at least to provide the public with a useful choice.

SUMMARY OF THE INVENTION

In a first aspect, the present invention provides a preparative method of isolating a preselected whey protein or group of whey proteins from a solution, wherein the method comprises the following steps:

(a) contacting a whey protein solution with a preselected ion exchanger for a time and at a temperature sufficient to enable the preselected whey protein to be adsorbed; wherein the whey protein solution has (1) a protein content in the range of about 5% to about 20% by weight, (2) a pH of a preselected level, which is the level at which the preselected whey protein or group of whey proteins selectively binds to the preselected ion exchanger, and (3) a reduced ionic strength; and (b) recovering either or both of the following: (1) the whey protein component adsorbed in step (a), and (2)

the breakthrough whey protein component not adsorbed in step (a).

In a further aspect the present invention provides a preparative method of isolating a preselected whey protein or group of whey proteins from a whey protein solution, wherein the method comprises the following steps:

(a) obtaining a whey protein solution which has a protein content in the range of about 5% to about 20% by weight;

(b) contacting the whey protein solution with a preselected ion exchanger to which the preselected whey protein or group of whey proteins selectively binds at a preselected pH, and wherein the ion exchanger also adjusts the pH of the whey solution to about the preselected pH and reduces the ionic strength of the whey solution; and (c) recovering either or both of the following: (1) the whey protein component adsorbed in step (b); and (2) the breakthrough whey protein component not adsorbed in step (b).

In this specification the term "reduced ionic strength", when used in relation to a whey protein solution, refers to a whey protein solution in which the concentration of salts (ash content) is reduced at the preselected pH at which the whey protein solution is to be contacted with the preselected ion exchanger, relative to a whey protein solution ultra filtered to the same protein concentration and subsequently adjusted to the same pH by addition of acid or base. The ionic strength is readily measured with a conductivity meter.

BRIEF DESCRIPTION OF THE DRAWINGS

The present invention will now be described in more detail with reference to the accompanying drawings, in which.

DESCRIPTION OF THE INVENTION

Figure 1:
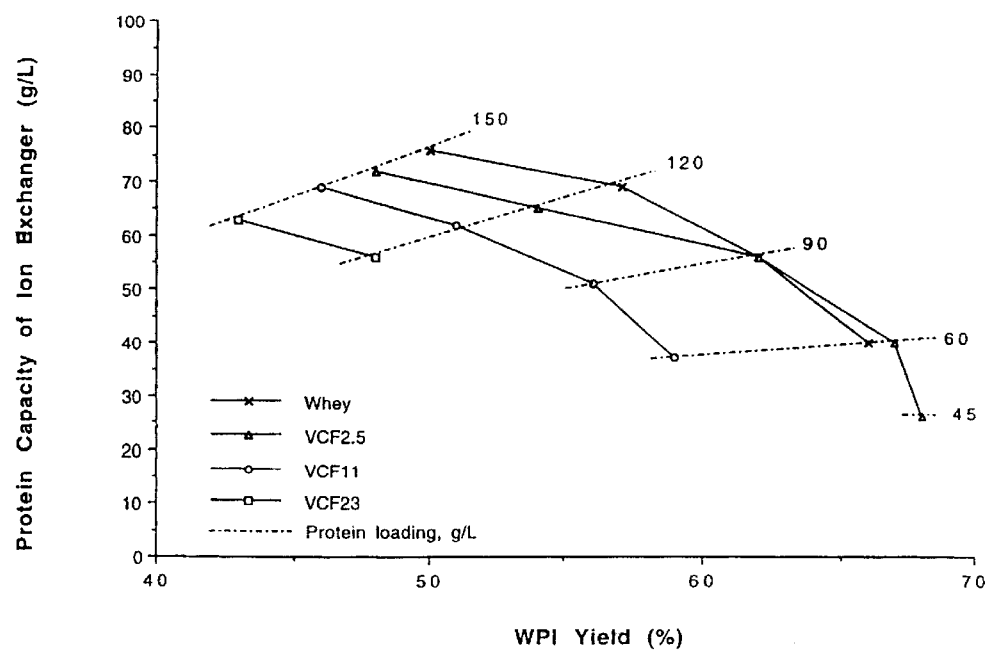
FIG. 1 is a plot of protein capacity of the SP cellulose exchanger (g/L) against the yield of whey protein isolate (WPI) for various preconcentrations of whey by ultrafiltration without any adjustment of the ionic strength.

The present invention relates to preparative methods for separating and recovering whey proteins from a solution using an ion exchanger.

The applicants have confirmed that preconcentrating whey, even by ultrafiltration which does not concentrate the salts, is detrimental to the operating capacity of the ion exchanger for protein. This loss in capacity is believed to be partly a result of the increase in ionic strength resulting form protein adsorption and ions being displaced. The applicants have also found that loss in protein binding capacity can result from the addition of acid or base to the protein solution to adjust the pH to the required level for protein adsorption to take place. This is particularly so for very concentrated solutions, such as ultrafiltration retentates from whey.

The applicants have also surprisingly found that feedstocks of whey protein solutions having high protein concentrations (about 5% to about 20% by weight) but reduced ionic strength (at the required pH for contact with the ion exchanger) can be used in ion exchange processes for separating whey proteins, without reducing the capacity of the ion exchanger for protein. The applicants have also found that, in order to obtain optimum performance from an ion exchanger, it is generally desirable that the whey protein solution has an ionic strength as low as possible at the required pH for contact with the ion exchanger. Generally, the lower the ionic strength at this pH, the greater the protein concentration that can be used. They have further found that by using high protein concentrations it is possible to use cold temperatures and short adsorption times and also achieve higher operating protein capacities for the ion exchanger than is possible with more dilute solutions, at least in the case of ion exchangers suitable for large scale industrial use. It is these findings by the applicants which form the basis for the present invention.

In one aspect, as defined above, the present invention provides a preparative method for isolating a preselected whey protein or group of whey proteins from a solution. The method involves the step (a) of contacting with a preselected ion exchanger a whey protein solution which has all three of the following: (1) a protein concentration in the range of about 5% to about 20% by weight, (2) a pH at a preselected level, namely the level at which the preselected whey protein or group of whey proteins selectively binds to the preselected ion exchanger, and (3) a reduced ionic strength. The solution is contacted with the preselected ion exchanger at a temperature and for a time which are sufficient to enable the preselected whey protein to be adsorbed onto the ion exchanger. This step is followed by the steps of recovering either or both of the whey protein component adsorbed on the ion exchanger, and the breakthrough whey protein component not adsorbed on the ion exchanger.

In step (a) in the process of the invention, a whey protein solution having a protein concentration in the range of about 5% to about 20% by weight is contacted with a protein-adsorbing ion exchanger. One preferred method of preparing such a whey protein solution is to ultrafilter whey to obtain a retentate having a protein concentration as high as practicable, preferably about 10–25% by weight. Suitable conditions for the ultrafiltration of whey will be known to those skilled in the art. For example, an ultrafiltration membrane with a nominal molecular weight cut off in the range of from about 5,000 Da to about 50,000 Da, more preferably about 10,000 Da, may be used. The retentate can then be treated in any one of a number of ways so as to achieve a final concentration of protein of 5–20% by weight at the required pH for contact with the ion exchanger and with a reduced ionic strength.

For example, in some preferred embodiments of the invention, a whey protein retentate which has been produced via ultrafiltration of whey (as described above) can be diluted with a limited amount of water (such that the protein concentration remains within the range of between about 5 and 20%) and the pH adjusted using acid or base. In another embodiment, a whey protein retentate may be subject to diafiltration, (optionally followed by dilution of the retentate with a limited amount of water) and adjusting the pH with acid or base.

In another preferred embodiment, a whey protein solution having a protein content in the range of about 5% to about 20% by weight, the appropriate pH and reduced ionic strength can be prepared by adjusting the pH of whey to the required value prior to ultrafiltration and/or diafiltration. The decrease in ionic strength is achieved because ions will pass through the ultrafiltration membrane, and since the required pH has already been achieved it is unnecessary to adjust the pH further (with the associated addition of further ions) after the ultrafiltration. Thus, the retentate of the ultrafiltration and/or diafiltration will have a lower ionic strength at the required pH than if the pH had been adjusted after ultrafiltration. If desired, a limited quantity of water can then be added, to reduce the ionic strength still further, while still retaining a protein concentration within the desired range.

Another preferred method of obtaining a whey protein solution having a protein concentration in the range of about 5% to 20% by weight is to take a whey protein concentrate (WPC powder) which has been obtained by ultrafiltration and has a protein content of around 55–85% on a dry weight basis, and reconstitute it with an appropriate quantity of water so as to achieve the required result of obtaining a solution with decreased ionic strength. The pH can be adjusted to the appropriate pH for contact with the ion exchanger by adding acid or base.

In still other embodiments of the invention, a whey protein solution having a protein concentration in the range of about 5% to about 20%, the appropriate pH and reduced ionic strength can be prepared by adjusting the pH of a whey protein solution, preferably a retentate obtained via ultrafiltration or a reconstituted WPC solution, with an ion exchanger in either the $H^+$ or $OH^-$ form, (such as Dowex™ 50W-X8($H^+$) resin), which does not adsorb protein, prior to the step of contacting the solution with a protein adsorbing ion exchanger.

In yet another embodiment of the invention, the reduced ionic strength can be achieved using mixed bed demineralisation, dialysis or electrodialysis of the retentate.

In the embodiments described above, the reduced ionic strength of the whey protein solution is achieved prior to bringing the whey protein solution into contact with the protein-adsorbing ion exchanger. These embodiments are suitable when the ion exchange is to take place in a column, or using a batch process in a bed of the ion exchanger in which the resin has been drained sufficiently such that the concentration of the whey protein solution applied to the resin will remain within the range of 5–20%. However, in another embodiment of the invention, which is suitable when a batch process, particularly a stirred bed process is to be used, the reduced ionic strength of the whey protein solution can be achieved by using a protein-adsorbing ion exchanger which contains a quantity of water in its bed. In this embodiment, the reduction in ionic strength will occur when the whey protein solution (preferably a whey protein retentate or reconstituted WPC powder) comes into contact with water in the bed of the protein-adsorbing ion exchanger. This will also reduce the protein concentration of the whey protein solution, and so the protein concentration of the whey protein solution to be brought into contact with the bed of ion exchanger will need to be chosen so the protein concentration actually contacting the ion exchange resin remains within the range of about 5 to about 20% by weight.

The pH adjustment may also be carried out prior to contacting the whey protein solution with the ion exchanger (for either a column process or a batch process), or immediately afterwards in the case of a batch process.

It is generally preferred that the whey protein solution obtained in step (a) has a conductivity of less than about 6 mS/cm, more preferably less than about 4 mS/cm. Generally speaking, the lower the conductivity of the solution, the greater the improvement in the capacity of the protein adsorbing ion exchanger.

It will be appreciated that the required pH of the whey protein solution to be obtained in step (a) of the process of the invention will be dependent on which protein (or proteins) it is desired to adsorb onto the ion exchanger, and the nature of the ion exchanger to be used. This is discussed in more detail below.

As outlined above, in the process of the present invention the whey protein solution is contacted with an ion exchanger which will adsorb a desired whey protein or proteins, followed by recovery of either the adsorbed protein (by elution from the ion exchanger) or the breakthrough (non-adsorbed) protein, or both. Although not essential, it is usually desirable from an economic point of view to recover both the adsorbed protein and the breakthrough protein.

The main proteins found in bovine whey are lactoferrin (Lf), immunoglobulin (Ig), α-lactalbumin (α-LA), β-lactoglobulin (β-LG), bovine serum albumin (BSA) and glycomacropeptide (GMP) (present only in sweet wheys). Table 1 below shows how ion exchangers can be used to recover one or more proteins from whey as protein isolates and how other proteins are left behind in the treated whey stream to be recovered, for example by ultrafiltration to give whey protein concentrates with enriched levels of those particular proteins (and depleted levels of protein removed).

TABLE 1

ADSORPTION OF WHEY PROTEINS BY ION EXCHANGERS

| Protein | Isoelectric point | Cation Exchangers | | Anion Exchangers | |
|---|---|---|---|---|---|
| | | pH 3–5 | pH 5–7 | pH 3–5 | pH 5–7 |
| Ig, Lf | 6–9 | Yes[1] | Yes[2] | No | No[3] |
| α-LA, β-LG, BSA | ≈5 | Yes[1] | No | No | Yes[4] |
| GMP | ≤4 | No[5] | No | Yes[6] | Yes |

[1]D E Palmer (1977). Process Biochemistry, 12, 24–28
D J Phillips, D J Jones and D E Palmer (1980): U.S. Pat. No. 4,218,490
[2]P F E Monsan, P A Thibault, C Brossard and C S J Bruvier, (1987). GB Patent, 2,179,947.
[3]R C Bottomley, (1985). EP 0,320,152 or U.S. Pat. No. 5,194,591, (1993).
[4]B Mirabel (1980). GB 1,563,990.
P J Skudder (1985). J Dairy Research, 52, 167–181.
[5]Y Kawasaki and S Dosako, (1992). EP 0,488,589.
[6]J Burton and P J Skudder, (1987). GB 2,188,526.
Y Kawasaki, S Dosako, M Shimatani and T Idota (1992). GB 2,251,858.

The above references are incorporated herein by reference.

Accordingly, it will be appreciated that by selecting an appropriate cation or anion exchanger and the pH appropriate to the ion exchanger, separation of a desired particular whey protein or group of whey proteins from the remaining whey proteins can be achieved.

For example, in one particular embodiment of the invention, in which it is desired to adsorb GMP onto the ion exchanger and thereby to obtain both a GMP fraction and a GMP-depleted fraction, an anion exchanger, which may conveniently be of the QA or DEAE-type and preferably of the industrially useful cellulosic type, is used. The pH of the sweet-whey-protein-containing solution to be applied to the ion exchanger should be about 4.5 to 5.0, although pH 3.0–4.5 may be used when the preselected whey protein is a glycosylated subfraction of GMP.

In an alternative embodiment of the invention, in which it is desired to adsorb the major whey proteins (mainly α-LA, β-LG and BSA), cation exchangers, such as the SP and CM types, and again preferably of the industrially useful cellulosic type, may be used. The pH of the whey protein solution to be applied to the resin should be between about 3.0 and about 4.5. The bound protein can be recovered from the ion exchanger to obtain a whey protein isolate (WPI) comprising the major whey proteins. The unbound breakthrough protein can also be processed to give a whey protein concentrate to recover residual protein.

In yet another embodiment of the invention, again in which it is desired to bind the major whey proteins to the ion exchanger, anion exchangers, conveniently of the QA or DEAE type and again preferably of the industrially useful cellulosic type, may be used instead of cation exchangers. In this embodiment of the invention, the pH of the whey solution to be applied to the reesin should be between about 5 and about 8. Again, a whey protein isolate (WPI) comprising mainly α-LA and β-LG will be produced by recovery of the bound protein and an Ig-enriched whey protein concentrate will be obtained by recovery of the breakthrough protein. The WPI may also contain GMP if the whey protein solution is sourced from sweet whey.

In a number of further embodiments, the same principles and process of the present invention can be applied to other procedures known in the art for preparing whey protein products, such as those indicated in the references following Table 1 above.

The step of contacting the whey solution with the ion exchanger to adsorb the desired protein can be carried out in any convenient manner. Preferred methods are to conduct this step in a stirred bed of ion exchanger or in a column of the ion exchanger. It is generally preferred that the adsorption step be carried out at a temperature of less than about 20° C., more preferably at around 8–15° C., to minimise the growth of mesophilic bacteria. It is also preferred that the contact time of the ion exchanger with the whey protein solution is less than about 2 hours, more preferably less than about 1 hour.

The steps of recovery of either or both of the bound protein and the breakthrough protein can be carried out using any suitable method known in the art, for example elution of the bound protein, followed by ultrafiltration and/or diafiltration, evaporation and then freeze-drying or spray-drying if a dry product is required.

One advantage of the method of the present invention that the applicants have surprisingly found is that the concentrated whey protein solutions with reduced ionic strength used herein require shorter contact times with the ion exchanger to achieve protein adsorption than if whey itself was used. For example, a contact time with the ion exchanger of only about 30 minutes at 10° C. can be sufficient, at least in the preferred embodiments of the invention, whereas prior art processes using dilute protein solutions may require an adsorption time of up to about 2 hours at 10° C. While the adsorption times can be shortened by using excess ion exchange resin, this is less economic.

In addition, the applicants have found that the same, or even better protein capacity as that obtained using dilute solutions can be obtained with the method of the present invention.

In a second aspect of the present invention, as defined above, a method of isolating a preselected whey protein or group of whey proteins from a whey solution comprises first the two steps of (1) obtaining a whey solution with a protein content in the range of about 5% to about 20% by weight, and (2) contacting the solution with an ion exchanger which performs all three functions of decreasing the ionic strength, adjusting the pH to about the required level for protein adsorption and binding the preselected whey protein(s).

These steps are followed by the recovery of the bound protein and/or the breakthrough protein, as desired. A suitable cation exchanger for use in this method, which will adjust the pH, reduce the ionic strength and bind the major whey proteins, is that known as CM GibcoCel™ resin, but any protein-binding resin of the weak acid type may be used in the H+ form. If required, the pH can also to be adjusted further to the preselected level for protein adsorption using acid or base.

EXAMPLE

The following examples are intended to be illustrative only and in no way limit the scope of the present invention.

Example 1

Comparative Example

Cheese whey (form a cheddar cheesemaking process) was concentrated by ultrafiltration to the volume concentration factors (VCFs) listed in Table 2. A Koch HFK131 ultrafiltration membrane with a nominal molecular weight cut off of 10,000 Da was used. Samples of the retentate were removed as the ultrafiltration progressed and their protein concentrations determined by Kjeldahl nitrogen analyses. Samples of the whey and the various retentates were then adjusted to pH 3.5 with 2 M sulphuric acid and mixed with 15–50 mL lots of drained SP cellulose ion exchanger sold under the trade mark SP GibcoCel™ HG2 (also previously known as SP Indion) for 1 hour at 25° C. to allow protein adsorption to take place. The ion exchanger had a settled volume of 1.4 mL/g of drained product. The amounts of whey, retentate and ion exchanger used were such that the amount of protein contacted with the ion exchanger (protein loading) was in the range 45–150 g of protein per litre of ion exchanger as shown in Table 1.

TABLE 2

| CONDITIONS USED FOR PROTEIN ADSORPTION | | | | | | |
|---|---|---|---|---|---|---|
| | Protein | Weight Used | Volume of Exchanger Used, mL Protein loading, g/L | | | |
| | conc. | g | 150 | 120 | 90 | 60 | 45 |
| Whey | 0.72 | 320 | 15 | 19 | 25 | 38 | — |
| VCF 2.5 | 1.70 | 130 | 15 | 19 | 25 | 38 | 50 |
| VCF 11 | 8.02 | 29 | 15 | 19 | 25 | 38 | — |
| VCF 23 | 14.8 | 15 | 15 | 19 | — | — | — |

At the end of the one hour adsorption period the SP GibcoCel™ exchanger was collected on a sintered glass filter, drained and washed with water. The combined filtrate and washings were made up to a known volume and analysed for residual protein by Kjeldahl nitrogen analyses. These results were used to calculate the weight of protein which was adsorbed by the ion exchanger and hence its operating capacity and the maximum yield of WPI which could be recovered from it by elution at pH 9.

The results are shown in FIG. 1 and clearly demonstrate the detrimental effect that preconcentration has on both the operating capacity of the ion exchanger and the yield of WPI.

Example 2

Figure 2:
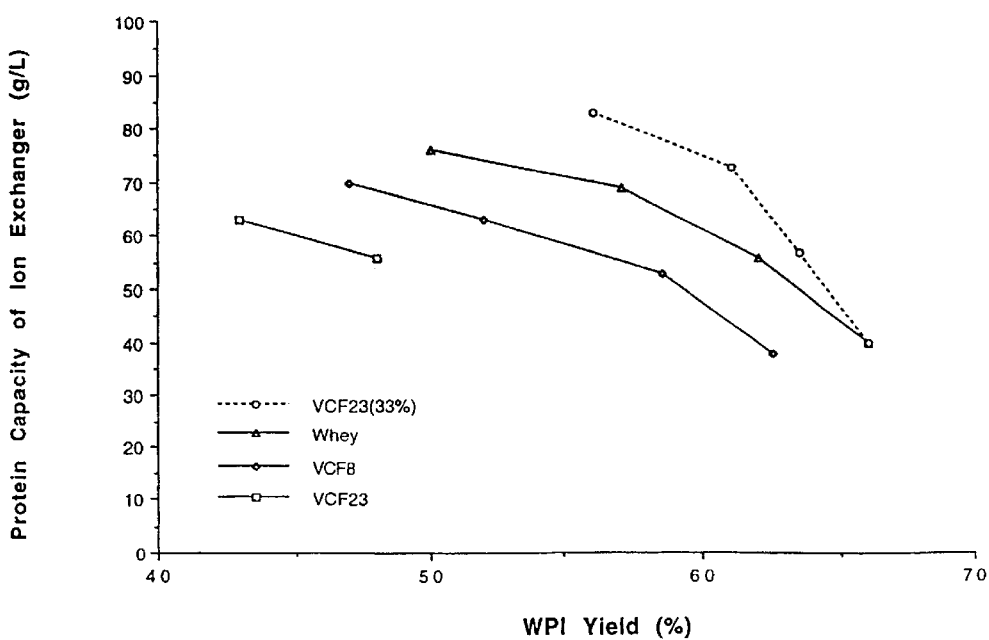
FIG. 2 is the same plot as in FIG. 1 showing the effect of lowering the ionic strength by diluting the UF retentate with water when an SP-cellulose resin is used.

The procedure was the same as Example 1 except that the VCF23 retentate (one part) was diluted with water (2 parts) to give a 33% solution of VCF23. The pH of this was adjusted to 3.5 with 2 M sulphuric acid before mixing 45 mL lots of it with 15, 19, 25 and 38 mL of SP GibcoCel™ exchanger as described in Example 1. The results shown in FIG. 2 demonstrate the improvement in performance obtained by lowering the ionic strength of the UF retentate when compared with both the original VCF23 and a VCF8 having the same protein concentration as the VCF23(33%). It thus allows the same or better performance than that obtained with whey plus the advantages to be gained on a production scale with a reduced volume of protein solution such as that illustrated in Example 3.

Example 3

Cheese whey (from a cheddar cheesemaking process) was adjusted to pH 3.5 with 2 M sulphuric acid and a 350 g sample of it was mixed with 25 mL of drained SP GibcoCel™ exchanger for 1 hour at 25° C. at pH 3.5. At the end of this period the SP GibcoCel™ exchanger was collected on a sintered glass filter, drained and washed with water. The combined filtrate and washings were made up to 450 mL and analysed for protein as described in Example 1.

The above process was repeated with a second sample (350 g) of whey at pH 3.5 and another 25 mL lot of SP GibcoCel™ exchanger but in this case the mixing time was only 30 minutes and a temperature of 10° C. was used.

The above procedure was repeated with 29 g of a UF retentate (VCF 11) and 45 g of UF retentate (VCF23) diluted with 2 parts of water as used in Examples 1 and 2 respectively. These conditions and results are summarised in Table 3.

The use of UF retentates, with or without reduced ionic strength, allowed short adsorption times at 10° C. that were not as effective with whey, but of the three conditions only the UF retentate with reduced ionic strength showed both a short adsorption time and maximum WPI yield.

TABLE 3

EFFECT OF TIME AND TEMPERATURE ON PROTEIN
ADSORPTION BY SP GIBCOCEL (25 mL) EXCHANGER

|  | Whey | VCF11 | VCF23 (33%) |
|---|---|---|---|
| (a) Conditions Used | | | |
| Protein Conc, % | 0.72 | 8.02 | 5.05 |
| Weight Used, g | 350 | 29 | 45 |
| Protein Loading, g | 2.52 | 2.32 | 2.27 |
| Protein Loading, g/L of SP | 100 | 92 | 91 |
| (b) Results | | | |
| WPI Yield, % | | | |
| 60 min at 25° C. | 61 | 56 | 64 |
| 30 min at 10° C. | 44 | 52 | 61 |
| Capacity of Exchanger, g/L | | | |
| 60 min at 25° C. | 61 | 51 | 57 |
| 30 min at 10° C. | 44 | 48 | 55 |

Example 4

Whey and UF retentates VCF11 and VCF23 as used in Example 1 were treated with a cation exchange resin in the H$^+$ form in order to adjust their pH levels from 5.9 to 3.5–4.0. For example, 10 mL (7.7 g) of Dowex™ 50W-X8 (H$^+$) resin was added to 70 mL of UF retentate VCF23 and stirred for 10 minutes. The pH of the retentate shifted to 3.9 during this time and it was then separated from the resin by filtration through a sintered glass filter. The conductivity of the whey stream before and after treatment with Dowex™ 50W-X8(H$^+$) resin was measured, as was the same whey stream after pH adjustment with 2 M sulphuric acid. Table 4 shows the conductivities of these solutions. The greater the preconcentration by ultrafiltration the more effective the Dowex™ (H$^+$) exchanger was in lowering the ionic strength of the retentate at pH 3.5–4.0. The protein concentration was not significantly affected by this treatment with the Dowex™ cation exchanger.

TABLE 4

CONDUCTIVITY OF WHEY AND RETENTATES

| | Conductivities (mS/cm) | | | | | |
|---|---|---|---|---|---|---|
| | Protein Conc. | At | After adjusting pH with | | Dowex Used | |
| | % | pH 5.9 | Dowex | with H$_2$SO$_4$ | mL/100 g$^1$ | mL/g$^2$ |
| Whey | 0.72 | 5.8 | 4.8 | 7.2 | 3.6 | 5 |
| VCF11 | 8.02 | 5.0 | 3 | 7.3 | 10 | 1.3 |
| VCF23 | 14.8 | 4.3 | 1.5 | 7.2 | 14 | 1.0 |

$^1$mL of Dowex ™ 50W-X8(H$^+$) resin per 100 g of whey or retentate.
$^2$mL of Dowex ™ 50W-X8(H$^+$) resin per g of protein in the whey or retentate.

Example 5

Samples of cheese whey retentate (VCF23) prepared as in example 1 were adjusted to pH 3.5 with 2 M sulphuric acid and by H$^+$ exchange with Dowex™ 50W-X8 resin as described in Example 1 and 4 respectively. In each case 15 g of the acidified retentate was mixed with 15 mL of SP GibcoCel™ exchanger for one hour at 25° C. to adsorb the protein. After this adsorption stage the retentate was separated from the SP GibcoCel™ exchanger by filtration, as described in Example 1, and analysed for residual protein. Table 5 shows the significant increase in WPI yield resulting from the enhanced protein capacity of the SP GibcoCel™ exchanger obtained by using this method of reducing the ionic strength.

TABLE 5

ADSORPTION OF PROTEIN BY SP GIBCOCEL (15 mL)
EXCHANGER FROM UF RETENTATE (15 g)

| | pH Shift | pH | Conduct. mS/cm | Protein Conc. % | WPI Yield % | SP Capacity g/L |
|---|---|---|---|---|---|---|
| VCF23 | H$_2$SO$_4$ | 3.5 | 7.2 | 14.8 | 43 | 63 |
| VCF23 | Dowex ™ | 4.0 | 1.5 | 14.8 | 57 | 84 |

Example 6

This example is similar to Example 5 except that only the one cation exchanger, CM GibcoCel™, was used to do the work of both the Dowex™ and SP GibcoCel™ cation exchangers.

CM GibcoCel™ resin (1 volume) was mixed with 2 volumes of water and titrated to pH 2 with 2 M sulphuric acid to convert it to the H$^+$ form. It was then drained. To this was added 0.74 volumes of a UF retentate (VCF 23) from cheese whey and 0.37 volumes of water. After mixing this for a few minutes the pH decreased to 4.2. It was adjusted further to pH 3.9 by the addition of 2 M sulphuric acid. After mixing for a total time of 45 minutes at room temperature the retentate was separated from the CM GibcoCel™ exchanger by filtration, as described in Example 1, and analysed for residual protein.

The process was repeated using a final pH of 3.7. The yield of WPI and operating capacity of the GibcoCel are shown in Table 6.

TABLE 6

ADSORPTION OF PROTEIN FROM UF RETENTATE (33 g) BY CM GIBCOCEL (30 mL) IN THE H+ FORM

|  | Protein Conc. % | Initial pH | Final pH | WPI Yield % | CM Capacity G/L |
|---|---|---|---|---|---|
| Retentate (66%) | 11.0 | 6.2 | 3.9 | 51.5 | 62 |
| Retentate (66%) | 11.0 | 6.2 | 3.7 | 52 | 63 |

Example 7

Cheese whey (from a cheddar cheese making process) was adjusted from pH 5.9 to 3.5 by the addition of 2 M sulphuric acid. It was then concentrated by ultrafiltration using a Romicon PM30 membrane. The retentate was diluted with half its volume of water and 25 mL lots of it were mixed at pH 3.5 with 12, 16, 20 and 27 mL samples of SP GibcoCel at 10° C. for 45 minutes. Another sample of the same cheese whey was concentrated by ultrafiltration at pH 5.9 and the pH of the retentate adjusted to pH 3.5 with 2 M $H_2SO_4$. This was then mixed with samples of SP GibcoCel under the same conditions. The amounts of retentate and ion exchanger used were such that the total amounts of protein presented to the ion exchanger (protein loading) were in the range of 90–200 g protein per litre of ion exchanger as shown in Table 7. The rest of the procedure to determine the amount of protein adsorbed was as described in Example 1.

Figure 3:
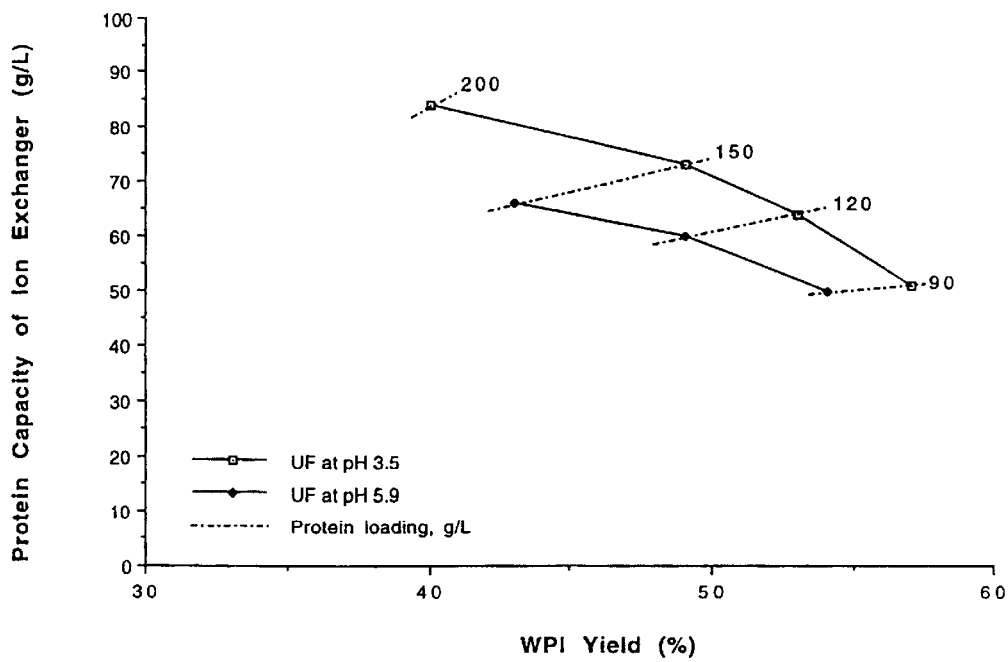
FIG. 3 is the same plot as in FIG. 1 showing the effect of lowering the ionic strength by adjusting the pH of whey prior to ultrafiltration.

The yields of WPI and protein capacities of the SP GibcoCel are shown in FIG. 3 and show the improvement obtained by carrying out the ultrafiltration at the pH required for the ion exchange step.

TABLE 7

CONDITIONS USED FOR PROTEIN ADSORPTION

| pH of UF | Protein Conc. % | Wt Used g | Volume of SP GibcoCel Used (mL) for Nominal Protein Loadings (g/L) of | | | |
|---|---|---|---|---|---|---|
| | | | 200 | 150 | 120 | 90 |
| 5.9 | 9.88 | 25 | — | 16 | 20 | 27 |
| 3.5 | 9.71 | 25 | 12 | 16 | 20 | 27 |

Example 8

Table 8 below shows the conductivities of UF retentates treated in various ways to lower the ionic strength and adjust the pH to 3.5 as outlined in the above examples. A diafiltered retentate is also included. It was not as effective as the other methods in lowering the ionic strength of the retentate at pH 3.5 but was still helpful.

TABLE 8

CONDUCTIVITIES OF UF RETENTATES

| Example No. | Treatment of retentate | pH adjustment | Conductivity (mS/cm) | |
|---|---|---|---|---|
| | | | At pH 5.9 | At pH 3.5 |
| 1 | Nil | $H_2SO_4$ | 4.3 | 7.2 |
| — | DF | $H_2SO_4$ | 2.1 | 5.1 |
| 2 | $H_2O$ (2 Vol) | $H_2SO_4$ | 2.2 | 4.0 |
| 4, 5 | Nil | Dowex ™ ($H^+$) | 4.3 | 1.5 |
| — | $H_2O$ (2 Vol) | Dowex ™ ($H^+$) | 2.2 | 0.9 |
| 6 | $H_2O$ (½ Vol) | CM GibCoCel ™ ($H^+$) and $H_2SO_4$ | 3.7 | N/A |
| 7 | $H_2O$ (½ Vol) | $H_2SO_4$ prior to UF | N/A | 4.2 |

(N/A = not applicable)

Example 9

A UF retentate (20% TS, 55% protein) prepared from cheese whey as in example 1 was adjusted in pH to 7.5 with 2 M sodium hydroxide. Samples (10 g) were then mixed for 30 minutes at room temperature with 3.3, 6.7 and 10 mL lots of the anion exchanger QA GibcoCel™ M HG2 which had been washed and drained. (Settled volume of 1.4 mL/g). The pH was maintained at 7.5 during this time. The QA Gibco-Cel™ resin was then collected on a sintered glass filter and washed with water. The filtrate and washings were made up to 40 mL in volume and analysed for residual protein by Kjeldahl nitrogen analyses. These results were used to calculate the weight of protein which had been adsorbed by the anion exchanger and hence its operating protein capacity and the maximum yield of WPI which could be recovered from it by elution with 0.5 M sodium chloride at pH 5–6. The adsorbed proteins were mainly α-lactalbumin, β-lactoglobulin and GMP.

This process was repeated with:

(a) 15 g samples of UF retentate(66%), ie retentate(2 parts) which had been diluted with water (1 part).

(b) 30 g samples of UF retentate(33%), ie retentate(1 part) which had been diluted with water (2 parts).

Figure 4:
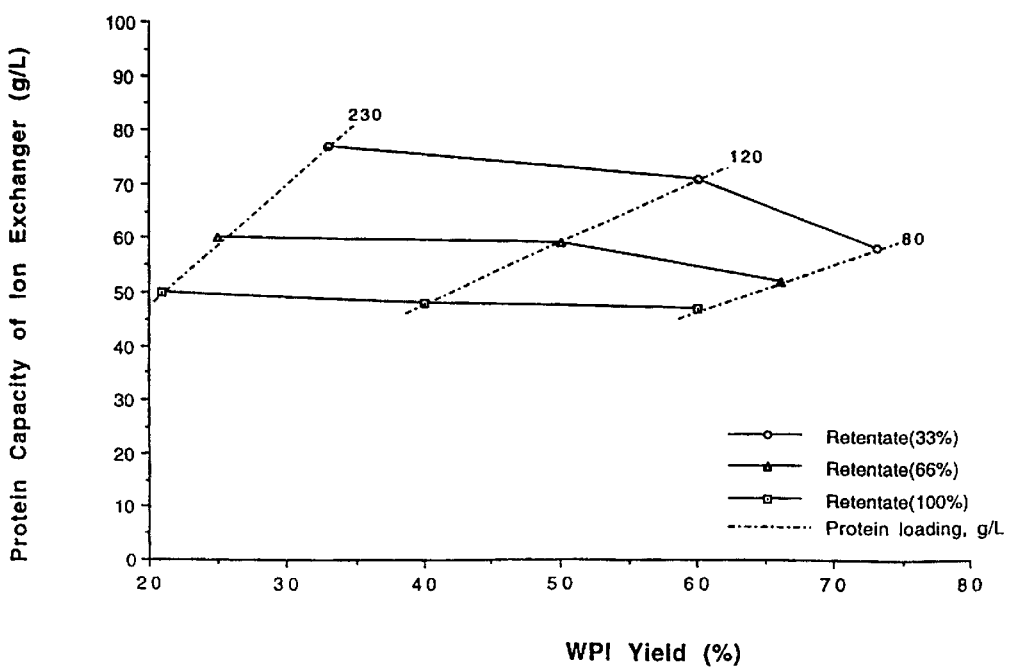
FIG. 4. is the same plot as FIG. 1 showing the effect of lowering the ionic strength by diluting the UF retentate with water when a QA-cellulose resin is used.

FIG. 4 shows the improvement in yield and operating protein capacity of the QA GibcoCel™ resin obtained on dilution of the retentate with water at each of the three protein loadings investigated. Protein loading is the total weight of protein present in the retentate which was mixed with the QA GibcoCel™ resin and is expressed as g of protein per litre of QA GibcoCel™ resin.

Example 10

Rennet casein whey was made form a batch of skim milk and clarified. Some of it was concentrated by ultrafiltration (DDS GR60 PP membranes) and then diafiltered after the addition of an equal volume of water. The retentate was then further diluted with an equal volume of water but not reconcentrated. The concentrations of glycomacropeptide (GMP) in the whey and the diluted retentate were determined by FPLC using a Mono™ S column (J Leonil and D Molle *J Dairy Research*, 58, 321–328, 1991) and found to be 1.64 and 13.8 mg/mL respectively. The pH of the whey and retentate was shifted to pH 4.9 by the addition of 5 M hydrochloric acid.

Samples of washed and drained QA GibcoCel™ resin, equivalent to either 5 or 10 mL of settled volume were weighed into beakers. Whey (50 mL) at pH 4.9 was then added to each one and mixed for one hour at room temperature. The pH was maintained at 4.9 during this time.

The QA GibcoCel™ resin was then collected in sintered glass filters, drained and washed. The combined filtrate and washings were collected to give 100 mL of "breakthrough". This was analysed for GMP by FPLC (Mono S column) and for α-lactalbumin, BSA and β-lactoglobulin by HPLC (TSK G3000 column).

The same procedure was repeated with the diluted retentate except that 6.7 and 20 ml lots of QA GibcoCel™ resin were used with 20 g samples of retentate. Table 9 summarises the conditions used and the performance of the QA GibcoCel™ resin. There was no detectable loss of whey proteins, other than GMP, from the whey or retentate breakthrough. The selectively adsorbed GMP was recovered from the QA GibcoCel™ resin by mixing it in 0.5 M sodium chloride for one hour without any pH adjustment.

TABLE 9

SELECTIVE ADSORPTION OF GMP BY QA GIBCOCEL RESIN AT pH 4.9

|   | GMP Conc. mg/mL | Load Vol. mL | QA Vol. mL | GMP Load mg/mL of QA | GMP Adsorb. Yield, % | QA Capac. mg/ml |
|---|---|---|---|---|---|---|
| Whey | 1.64 | 50 | 10 | 8.2 | 34 | 3 |
| Whey | 1.64 | 50 | 5 | 16.4 | 21 | 3.5 |
| Retentate + H₂O | 13.8 | 20 | 20 | 13.8 | 97 | 14 |
| Retentate + H₂O | 13.8 | 20 | 6.7 | 41.4 | 58 | 24 |

Example 11

A WPC powder containing 80% protein (sold under the trade name ALACEN 392) manufactured from cheese whey was reconstituted at 15% total solids and its pH was adjusted to pH 4.8 with 5M hydrochloric acid. 160 L of this solution was mixed for 30 minutes at 10° C. with 160 L of QA GibcoCel™ HG2 resin that was previously fully flooded with water giving a solution of approximately 8% protein at the time of contact. This mixing was carried out in a 500 L tank fitted with a screen across the bottom. At the end of the mixing period the resin was drained and washed with 100 L of water.

The GMP-depleted filtrate (breakthrough) and washings were adjusted to pH 6.0 with sodium hydroxide and concentrated to 22% total solids by ultrafiltration on Koch HFK 131 membranes. The resulting retentate was further neutralised and spray dried to give a GMP-depleted WPC powder (the GMP content of this powder, as determined by the method described in example 10, was 5.1% of Kjeldahl protein as compared with a GMP level of 20% of protein in the original cheese WPC).

The GMP was recovered from the washed and drained resin by adding one bed volume of water and sodium chloride to give a concentration of 100 mM then mixing for one hour at 10° C. at pH 2.0. The eluted GMP solution was then drained from the vessel and the resin was washed with half a bed volume of water to give 220 L of eluate. This was adjusted to pH 6.8 with sodium hydroxide and then ultra filtered and diafiltered using the same membranes as for the breakthuough solution to give a UF retentate at 13.5% solids. This retentate was spray dried to give a GMP-enriched isolate powder with a purity estimated to be greater than 85% of protein.

Example 12

This was the same as Example 11 except that instead of shifting the pH of the 10% reconstituted WPC with hydrochloric acid, a cation exchanger in the H⁺ form was used. Dowex™ 50W-X8(H⁺) (48 g) resin was added to the WPC solution (3 litres) and stirred for 10 minutes. When the pH had dropped to 4.8, the Dowex™ 50W-X8 resin was removed by filtration and 2.5 litres of the filtrate at pH 4.8 was used as in Example 11. Table 10 below summarises the conditions used in Examples 11 and 12 and shows the performance of the QA GibcoCel™ resin.

TABLE 10

RECOVERY OF GMP FROM RECONSTITUTED WPC (10%) BY QA GIBCOCEL RESIN AT pH 4.8

|   | Method of pH shift | GMP conc. g/L | Load Vol. L | QA Vol. L | GMP Yield % adsorbed | Capac. of QA g/L |
|---|---|---|---|---|---|---|
| Example 11 | HCl | 14.4 | 1.5 | 1 | 97 | 21 |
| Example 12 | Dowex™ (H⁺) | 14.3 | 2.5 | 1 | 100 | 36 |

Example 13

Cheddar cheese whey was concentrated to 22% total solids by ultrafiltration using Koch HFK 131 membranes. 40 kg of UF retentate was mixed with 25 kg water to give a solution containing 9.1% protein (as measured by Kjeldahi nitrogen analysis). The diluted retentate was acidified to pH 3.7 with 10% sulphuric acid then mixed with 55 L of drained SP GibcoCel HG2 resin for 40 minutes at 15° C. in a 100 L stirred vessel. The protein depleted retentate was drained form the vessel and the bed washed twice with one bed volume of water each. The adsorbed whey proteins were eluted from the resin by stirring the resin in one bed volume of water hydroxide to adjust the pH to 9.0 for one hour. The eluted protein stream was drained from the resin which was washed as per the protein adsorption stage.

The combined eluate plus washings (106 L) contained 3.2% protein which equates to a protein binding capacity of the resin of 47 g protein/L resin. The eluate steam was adjusted to pH 6.7 with hydrochloric acid, ultra filtered to 19% total solids then spray dried to give a whey protein isolate powder. The WPI powder contained 93.7% protein of which 78% was β-lactoglobulin, 16% was α-lactalbumin and 3% BSA.

INDUSTRIAL APPLICATION

It is believed that the methods of separating and recovering whey proteins of the present invention will find widespread acceptance in the daily industry, as they will enable various whey protein components to be isolated and prepared on an industrial scale more efficiently and economically than was previously the case. In particular, the methods of the present invention allow high protein concentrations to be applied to ion exchangers, without compromising the capacity of the ion exchanger. In fact, at least in the preferred embodiments, the capacity of the ion exchanger may be improved over that achieved with a dilute solution such as way. In turn, this will enable the process to be carried out using lower volumes and therefore allow smaller vessels to be used in batch operation. Further, transfer times in and out of the vessel (either a batch reactor or a column) will be reduced. Still another advantage is that shorter contact times with the ion exchanger are possible, thereby eliminating any need to speed up protein adsorption by using excess resin. These shorter transfer and contact times reduce the overall cycle time and decrease the cost of production.

Although the present invention has been described with reference to specific embodiments, those skilled in the art will appreciate that modifications and alterations of the embodiments described can be made without departing from the scope of the invention.

What is claimed is:

1. A preparative method of isolating a preselected whey protein or group of whey proteins from a whey protein solution by ion exchange, comprising the steps of
   (a) obtaining a whey protein solution having a protein concentration in the range of about 5% to about 20% by weight by ultrafiltration;
   (b) adjusting the pH of said whey protein solution to a preselected pH at which said whey protein or group of whey proteins selectively binds to an ion exchanger;
   (c) reducing the ionic strength of said whey protein solution by a method other than ultrafiltration, relative to a whey protein solution ultra filtered to the same protein concentration and subsequently adjusted to the same pH by addition of acid or base, while maintaining the protein concentration within the range of about 5% to about 20% by weight upon contact with but prior to adsorption onto a preselected ion exchanger;
   (d) contacting said whey protein solution with said ion exchanger, which may contain water, wherein said whey protein or group of whey proteins selectively binds to said ion exchanger; and
   (e) recovering either or both of the following: (1) the whey protein component selectively bound to said ion exchanger in step (d), and (2) the breakthrough whey protein component not bound to said ion exchanger in step (d);
      wherein step (b) and/or step (c) is optionally carried out after contact with the ion exchanger in step (d).

2. A method as claimed in claim 1 wherein the whey protein solution obtained in step (a) is whey protein concentrate powder (WPC) which has been reconstituted with water.

3. A method as claimed in claim 2 wherein in step (d) the reconstituted WPC is contacted with a water-containing bed of the preselected ion exchanger.

4. A method as claimed in claim 1 wherein in steps (b) and (c) the preselected pH level and reduced ionic strength are achieved by contacting the whey protein solution with an ion exchanger in the acid or base form which does not adsorb the preselected whey protein or group of whey proteins.

5. A method as claimed in claim 1 wherein step (a) additionally comprises diafiltration to obtain said whey protein solution.

6. A method as claimed in claim 1 wherein the conductivitiy of the whey protein solution in initial contact with the ion exchanger in step (d) is less than about 6 mS.

7. A method as claimed in claim 1 wherein the conductivity of the whey protein solution in initial contact with the ion exchanger in step (d) is less than about 4 mS.

8. A method as claimed in claim 1 wherein step (e) is carried out at temperature of less than about 20 °C.

9. A method as claimed in claim 8 wherein step (e) is carried out at a temperature of about 8–15° C.

10. A method as claimed in claim 8 wherein the contact time of the whey protein solution with the ion exchanger is less than about 2 hours.

11. A method as claimed in claim 10 wherein the contact time of the whey protein solution with the ion exchanger is less than about one hour.

12. A method as claimed in claim 1 wherein the preselected group of whey proteins consists mainly of α-lactalbumin and β-lactoglobulin, the ion exchanger is an anion exchanger bearing quaternary ammonium or diethylaminoethyl groups and the preselected pH is between about 5 and 8.

13. A method as claimed in claim 12 wherein the whey protein solution has been obtained from sweet whey and the preselected group of whey proteins further includes GMP glycomacropeptide.

14. A method as claimed in claim 1 wherein the preselected whey protein is glycomacropeptide and the ion exchanger is an anion exchanger bearing quaternary ammonium or diethylaminoethyl groups, and the preselected pH is between about 4.5 and 5.

15. A method as claimed in claim 1 wherein step (e) comprises recovering both the bound whey protein component and the breakthrough whey protein component not bound to said ion exchanger in step (d).

16. A method as claimed in claim 1 wherein the ion exchanger is of the industrially useful GibcoCell™ range of cellulosic ion exchangers.

17. A preparation method of isolating a preselected whey protein or group of whey proteins from a whey protein solution by ion exchange, comprising the steps of:
   (a) obtaining a whey protein solution having a protein concentration in the range of about 5% to about 20% by weight by ultrafiltration of whey;
   (b) contacting said whey protein solution with said preselected ion exchanger, which may contain water, to which the preselected whey protein or group of whey proteins selectively binds at a preselected pH, and wherein the ion exchanger also adjusts the pH of the whey protein solution to about the preselected pH and reduces the ionic strength of the whey protein solution; and
   (c) recovering either or both of the following: (1) the whey protein component adsorbed in step (b); and (2) the breakthrough whey protein component not adsorbed in step (b),
      wherein the reduced ionic strength is calculated relative to a whey protein solution ultra filtered to the same protein concentration and subsequently adjusted to the same pH by addition of acid or base.

18. A method as claimed in claim 17 wherein the ion exchanger is an ion exchanger bearing weak acid groups and in the acid form, and the preselected group of whey proteins is the group consisting of α-lactalbumin, β-lactoglobulin and bovine serum albumin.

19. A method as claimed in claim 1 or claim 17 wherein the preselected group of whey proteins consists mainly of α-lactalbumin, β-lactoglobulin and bovine serum albumin, the ion exchanger is a cation exchanger bearing sulfonic acid or carboxymethyl groups, and the preselected pH is between about 3.0 and 4.5.

20. A method-as claimed in claim 19 wherein the group of whey proteins further includes immunoglobulin.

* * * * *